United States Patent [19]

Netter et al.

[11] Patent Number: 5,079,995
[45] Date of Patent: Jan. 14, 1992

[54] AUXILIARY REMOTE-CONTROLLED RELEASE DEVICE FOR A POSITIVELY ACTING MECHANISM

[75] Inventors: Alain Netter, Villefontaine; Michel Bline, L'Arbresle, both of France

[73] Assignees: Framatome, Courbevoie; Cogema, Velizy Villacoublay, both of France

[21] Appl. No.: 530,287

[22] Filed: May 30, 1990

[30] Foreign Application Priority Data

May 31, 1989 [FR] France ............... 89 07185

[51] Int. Cl.⁵ ............................................. F15B 15/26
[52] U.S. Cl. ................... 92/18; 92/130 R; 92/130 C; 92/15; 74/89.15; 74/625; 376/260; 376/261
[58] Field of Search ........... 92/13.5, 13.6, 13.8, 92/63, 130 A, 130 R, 145, 18; 376/228, 232, 260, 261; 74/89.13, 89.15, 625

[56] References Cited

U.S. PATENT DOCUMENTS

| | | | |
|---|---|---|---|
| 343,466 | 8/1886 | Maas | 74/625 |
| 2,656,820 | 10/1953 | Becker | 92/13.8 |
| 3,020,888 | 2/1962 | Braun | 92/18 |
| 3,069,931 | 12/1962 | Brown | 74/625 X |
| 3,075,407 | 1/1963 | Werner | 74/625 |
| 3,528,320 | 9/1970 | Maniker et al. | 74/625 |
| 4,198,844 | 4/1980 | Lowe et al. | 92/13.8 X |
| 4,292,133 | 9/1981 | Sasaki et al. | 376/260 |
| 4,545,084 | 10/1985 | Peterson | 74/625 X |
| 4,738,107 | 4/1988 | Garlander | 92/13.6 X |

FOREIGN PATENT DOCUMENTS 1272066  8/1961  France ............... 376/232

Primary Examiner—Edward K. Look
Assistant Examiner—Todd Mattingly
Attorney, Agent, or Firm—Pollock, Vande Sande & Priddy

[57] ABSTRACT

The positively acting mechanism comprises a jack (2) with a rod (10) connected, at one of its ends, to a member whose actuation or retention it ensures, and, at its other end, to a thrust piece (16), on which a spring (18) comes to bear, in order to actuate or retain the member. An axle (25) parallel to the rod (10) of the jack is rotatably mounted in a housing (14) fixed relative to the body (3) of the jack (2) and has a threaded part (26) in engagement with a nut (34) forming an engagement fork for the thrust piece (16) of the rod (10). The axle (25) has an end part (30) engaging with a tool allowing the axle (25) to be set in rotation remotely. It is thus possible, in the event of failure of the jack, to rotate the axle (25) and displace the rod (10) of the jack (2) in the direction of release of the mechanism.

6 Claims, 3 Drawing Sheets

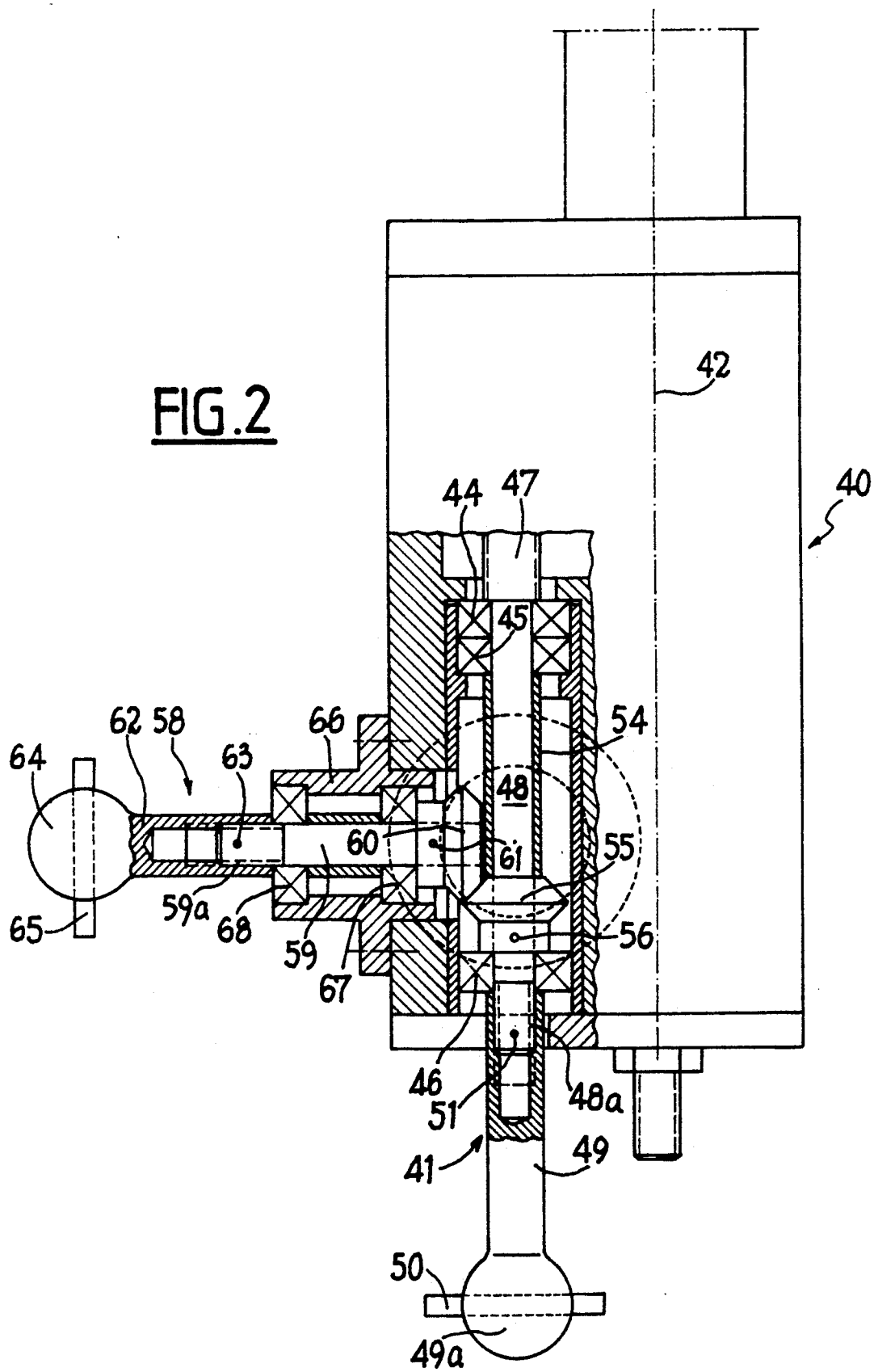

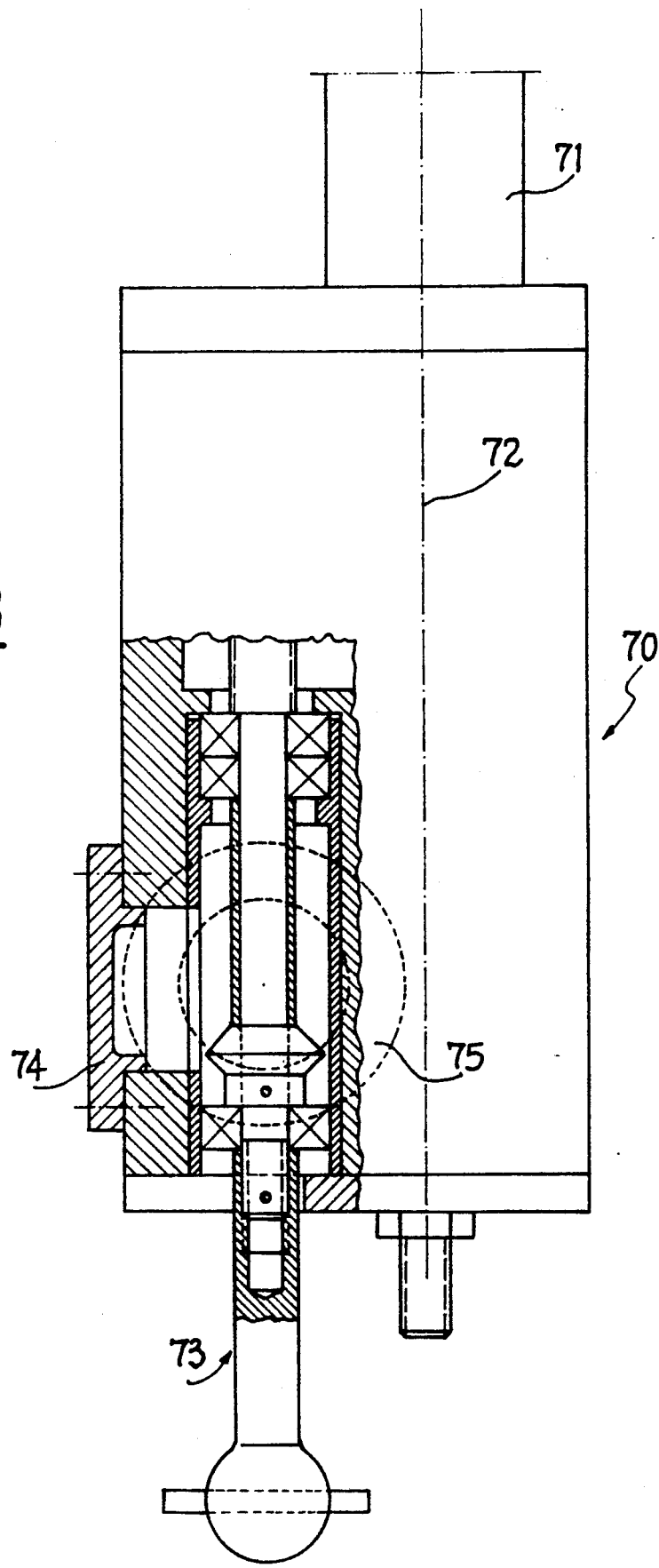

AUXILIARY REMOTE-CONTROLLED RELEASE DEVICE FOR A POSITIVELY ACTING MECHANISM

FIELD OF THE INVENTION

The invention relates to an auxiliary remote-controlled release device for a positively acting mechanism.

BACKGROUND OF THE INVENTION

The devices used in operations for the maintenance or repair of nuclear reactors or of their fuel assemblies and, more generally, in work carried out on sensitive installations conventionally comprise so-called positively acting mechanisms which ensure a high degree of operating safety of these devices.

In particular, devices for the maintenance or repair of nuclear reactors or of their fuel assemblies can comprise grasping means, such as tongs, the actuation of which is ensured by means of a positively acting mechanism.

Such a mechanism comprises a jack which can be fed with hydraulic fluid or with demineralized water and the rod of which is connected, at one of this ends, to the member being actuated or retained, and this member can, for example, consist of a piece or a clamping jaw of a pair of grasping tongs.

An elastic actuating means, such as a helical spring, comes to bear on a thrust piece fixed to that end of the rod of the jack with is opposite the end connected to the actuated member. The spring is arranged in a housing fixed relative to the body of the jack and maintained in a state of tension or compression, ensuring the actuation or retention of the member connected to the rod of the jack, when the jack is not fed with hydraulic fluid.

For example, if grasping tongs are involved, a movable jaw of these tongs can be retained in the clamping position by means of the spring, as long as the jack is not being fed.

In the event of failure of the jack, for example a breakdown in its feed, the positive action of the mechanism is not released.

The feed of the jack with hydraulic fluid makes it possible to displace its rod in the direction opposite to the direction of actuation of the elastic means, and thus to release the positive action of the mechanism. For example, where grasping tongs are involved, the activation of the jack makes it possible to unclamp the tongs by releasing at least one of its clamping jaws.

In the event of a breakdown making it impossible to actuate the jack, for example in the event of a breakdown in the feed of the jack with hydraulic fluid or with demineralized water, even though the operating safety of the device having the positively acting mechanism is not jeopardized, the fact that the mechanism cannot be released may cause problems, inasmuch as it is usually not possible to have access to the mechanism which is used for working on irradiated components under a particular head of water.

SUMMARY OF THE INVENTION

The object of the invention is, therefore, to provide an auxiliary remote-controlled release device for a positively acting mechanism comprising a jack, the rod of which is connected, at one of its ends, to a member whose actuation or retention it assures, and, at its other end, to a thrust piece, on which an elastic actuating means, such as a spring, comes to bear, in order to obtain the actuation or the retention of the actuated member, the spring being arranged in a housing fixed relative to the body of the jack, and the activation of the jack ensuring a displacement of its rod in the direction opposite to the direction of its actuation by the elastic means, the auxiliary device making it possible to cancel the positive action of the mechanism by remote control, even when the jack cannot function.

To this end, the auxiliary device according to the invention comprises:

an axle parallel to the rod of the jack, mounted rotatably in the housing and comprising a threaded part on the inside of the housing and an end part located on the outside of the housing and having means capable of interacting with corresponding means of a remote-actuation tool for setting the axle in rotation by means of the tool, and a nut engaged on the threaded part of the axle and fixed to a fork for the engagement of the thrust piece of the rod of the jack, for displacing it in the direction opposite to the direction of actuation of the elastic means, by setting the axle in rotation by means of the tool, in the event of the failure of the jack.

BRIEF DESCRIPTION OF THE DRAWINGS

To make it easy to understand the invention, a plurality of embodiments of an auxiliary release device according to the invention will not be described by way of example, with reference to the accompanying drawings.

FIG. 2 is a partial elevation view, in section in a vertical plane, of a second embodiment of the device.

FIG. 3 is a partial elevation view, in section in a vertical plane, of a third embodiment of the device.

DESCRIPTION OF PREFERRED EMBODIMENTS

Figure 1:
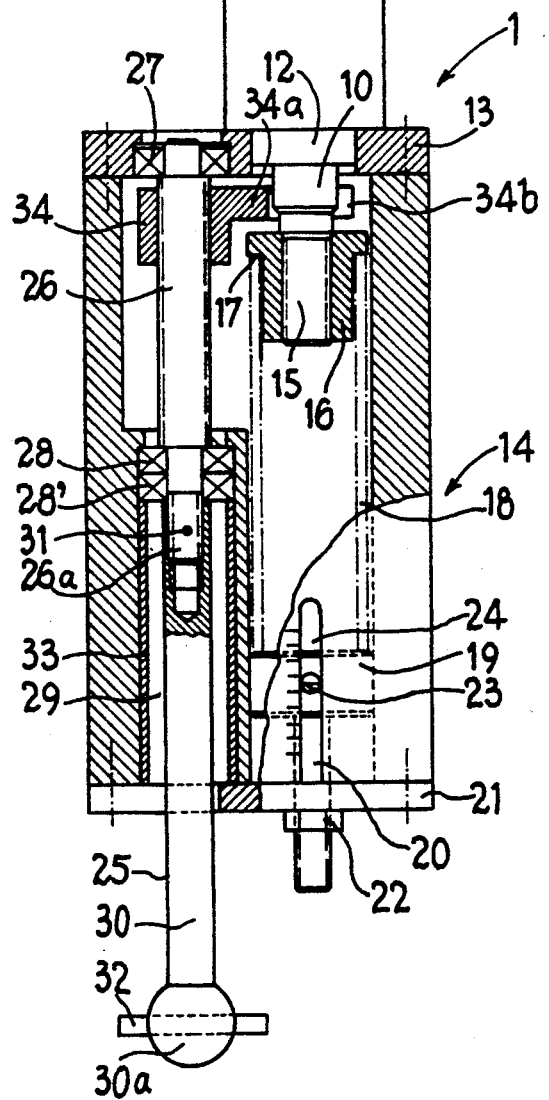
FIG. 1 is an elevation view, in section in a vertical plane, of a first embodiment of a release device according to the invention.

FIG. 1 shows a positively acting mechanism 1, which is associated with an auxiliary release device according to the invention.

The positively acting mechanism comprises a jack 2, the body 3 of which has an end part 4 of reduced diameter which is introduced and secured in the bore 5 of an annular support 6, itself connected to the body 7 of the tool, with which the positively acting mechanism is associated, by means of pivot axles 8.

The tool may consist, for example, of grasping tongs comprising a body 7 and one or more clamping jaws mounted movably relative to the body 7.

The rod 10 of the jack 2 has an end part engaged in the body 7 of the tool and connected to a movable member of this tool, of which the positively acting mechanism ensures the displacement or retention.

The body 3 of the jack 2 has, at its end opposite the shoulder 4 secured in the support 6, a second shoulder 12 which is engaged and secured in a bore passing through a flange 13 carrying a housing 14 of parallelepipedic form.

The end of the rod 10 of the jack 2 opposite the end connected to the movable part of the tool and engaged inside the housing 14 has a threaded part 15, on which a nut 16 with a shoulder 17 is screwed.

A helical spring 18 is arranged in the housing, in the extension of the rod 10 of the jack. The spring 18 is engaged at its upper end on the nut 16 and bears on the shoulder 17. The lower part of the helical spring 18 is engaged in a cylindrical receptacle located inside the housing 14 and bears on a pusher 19 maintained in position in the cylindrical receptacle of the housing 14 by means of a threaded rod 20 which is screwed into an internally threaded hole passing through a flange 21 closing the housing 14 in its lower part and which is locked in position by means of a nut 22.

The threaded rod 20 and the nut 22 make it possible, by means of the pusher 19, to adjust the compression of the spring 18 exerting a thrust on the rod 10 of the jack, by means of the nut 16.

Fastened to the pusher 19 is a pointer 23, the end of which is engaged in an orifice 24 passing through the side wall of the housing 14.

The position of the pointer 23 makes it possible to ascertain the state of compression of the spring 18 and therefore the calibration force of this spring exerting a thrust on the rod 10 of the jack 2.

This calibration force of the spring 18 makes it possible to maintain the rod 10 in its upper position, shown in FIG. 1, which corresponds to the position of retention of the movable member fixed to the end of the rod 10.

As regards grasping tongs, this position corresponds to the clamping position of the tongs, a movable jaw of which is fixed to the rod 10.

The jack 2 is a single-acting jack which can be fed with hydraulic fluid or with demineralized water, to ensure downward displacement of the rod 10, this displacement of the rod 10 being accompanied by compression of the spring 18. The release of the mechanism retaining the tool and, for example, the unclamping of grasping tongs can thus be obtained by remote control.

This remote actuation can be controlled, for example, from the edge of the fuel well of a nuclear rector, if the positively acting mechanism is associated with a fuel-assembly grasping device.

If it is not possible to activate the jack remotely, for example if the feed circuit of the jack has failed, the auxiliary release device according to the invention is used to obtain the displacement of the rod of the jack.

This device comprises an axle 25 in two parts which are mounted inside the housing 14 in a direction parallel to the direction of the rod 10 of the jack.

The axle 25 comprises a first part 26 consisting of a threaded rod mounted rotatably in the housing by means of a roller bearing 27 fastened in the flange 13 and of two roller bearings 28, 28' fastened to the end of a cylindrical receptacle 29 in the housing 14. The threaded rod 26 has two smooth parts which are located on either side of its threaded part and which are engaged and secured in the inner rings of the bearings 27 and 28, 28', respectively. The rod 26 also possesses, beyond the smooth part engaged in the bearings 28, 28', a threaded part 26a, to which the second part 30 of the axle 25 is connected. This part 30 has, at one of its ends, an internally threaded bore engaging with the threaded part 26a, the second part 30 of the axle being locked against rotation relative to the first part 26 by means of a pin 31.

The second part 30 of the axle 25 comprises an end part which is located on the outside of the housing 14 and which terminates in a knuckle 30a, in which is engaged a radially directed pin 32, the ends of which project relative to the surface of the knuckle 30a.

The roller bearings 28, 28' are retained against the bottom of the cylindrical receptacle 29 by means of a tubular spacer 33, itself retained in position inside the housing by means of the closing flange 21.

A nut 34 is engaged on the threaded rod 26 forming the first part of the axle 25. The nut 34 has a radially projecting part 34a, through which extends a longitudinal orifice 34b, in which the end of the rod 10 is engaged in its part located above the nut 16. The radially projecting part 34a through which the orifice 34b extends constitutes an actuating fork capable of coming into engagement with the nut 16 forming the thrust piece of the rod 10.

In the event of the failure of the jack 2, the auxiliary release device according to the invention makes it possible to displace the rod 10 by means of the nut 34.

A tool is used for this purpose which can be fastened to the end of a pole and joined to the end part of the axle 25 consisting of the knuckle 30a and the pin 32, so as to make the tool integral in terms of rotation with the axle 25.

The axle 25 is set in rotation by means of the pole and the tool in a direction causing downward displacement of the nut 34, the projecting part 34a of which comes in contact with the upper part of the nut 16. The displacement of the nut 34 produces a corresponding displacement of the nut 16 and of the rod 10 and compression of the spring 18. The downward displacement of the rod 10 causes release of the positively acting mechanism, despite the failure of the feed circuit of the jack.

If the positively acting mechanism is accessible only from the top, for example a mechanism immersed in the water of a fuel-assembly storage pool, it is of course advantageous to arrange the housing 14 of the mechanism and the actuating part of the axle 25 above the tool on which the mechanism acts, i.e., in a position opposite the position shown in the drawings.

In general terms, depending on the position of the tool with which the positively acting mechanism is associated, that end of the axle 25 which is located on the outside of the housing 14 and to which the tool making it possible to set the axle 25 in rotation is connected can be difficult to access if a remotely manipulated pole is used.

In this case, it can be advantageous to provide a plurality of ends for the connection of a tool for setting the axle in rotation, which are arranged in different positions and which are oriented differently in relation to the faces of the housing.

A device of this type has been shown in FIG. 2.

The device comprises, on the inside of a housing 40, an axle 41 mounted in parallel with the axle 42 for actuating the rod of the jack of the positively acting mechanism. The axle 41 is mounted rotatably inside the housing by means of ball bearings 44, 45 and 46. The axle 41 comprises a first part 47 consisting of a threaded rod coming into engagement with the actuating nut of the rod of the jack (not shown in FIG. 2). The threaded rod 47 has an extension 48 consisting of a smooth rod with a threaded end 48a. This threaded end makes it possible to join the rod 47, by means of its extension 48, to the second part 49 of the axle 41 consisting of a rod, the end 49a of which is in the form of a knuckle and through which a pin 50 passes radially.

The other end of the part 49 of the axle 41 has an internally threaded bore making it possible to assemble the parts 48 and 49 of the axle 41 together by means of the thread 48a and of a locking pin 51.

Slipped in succession onto the smooth part 48 of the axle 41 intermediate between the parts 47 and 49 are the ball bearing 44 bearing on a shoulder of the threaded part 47, the ball bearing 45, a tubular spacer 54, a bevel wheel 55 locked on the part 48 of the axle 41 by means of a pin 56, and the ball bearing 46.

The end of the part 49 of the axle 41 is located outside the housing and, as described above, makes it possible to set the axle 41 in rotation by means of a tool fastened to the end of a pole and having assembly means complementary with the knuckle 49a and the pin 50, in order to ensure that the rotation of the tool is transmitted to the axle 41.

If the end of the part 49 of the axle 41 is not accessible remotely, for example if the device is placed in a vertical position, as shown in FIG. 2, inside a fuel-assembly storage pool under several meters of water, a second assembly 58 arranged in an accessible position can be used to transmit rotational movement to the axle 41.

The second assembly 58 is placed on a lateral face of the housing 40 and comprises an actuating axle perpendicular to the axle 41.

This actuating axle comprises a first part 59 consisting of a rod fixed, at its end, to a bevel wheel 60 secured to the rod 59 by means of a pin 61.

The bevel wheel 60 meshes with the bevel wheel 55 fastened on the axle 41.

The rod 59 has a threaded end part 59a ensuring that it is joined to a second part 62 of the second actuating axle of the auxiliary release device. The parts 59 and 62 of the second axle are locked in terms of rotation relative to one another by means of a pin 63. The second part 62 of the second axle has, at its end, a knuckle 64 through which a pin 65 passes in the radial direction.

The second axle is mounted rotatably on the inside of a sleeve 66 fastened to a lateral face of the housing 40, by means of rolling bearings 67 and 68.

If the assembly end of the axle 41, consisting of the knuckle 49a and the pin 50, is inaccessible, the tool fastened to the end of the actuating pole is engaged on the assembly elements 64 and 65 arranged at the end of the second actuating axle of the auxiliary release device.

The setting in rotation of the second axle ensures that the axle 41 is set in rotation by means of the bevel wheels 60 and 55. The release of the positively acting device can thus be obtained, whatever its arrangement and orientation, in the event of the failure of the jack.

It is possible to provide various locations on the housing of the positively acting device for fastening secondary axles making it possible to set in rotation the main axle, the threaded part of which is in engagement with the nut for the displacement of the rod of the jack.

FIG. 3 illustrates a housing 70 of a positively acting mechanism, fixed relative to a jack body 71 having an actuating axle 72.

Mounted inside the housing 70, as before, is an auxiliary device for the release of the positively acting mechanism, comprising an axle 73 parallel to the actuating axle 72 of the jack.

The axle 73 will not be described in detail, as it is identical to the axle 41 shown in FIG. 2.

Moreover, there are, in lateral positions on two perpendicular faces of the housing, orifices which pass through the wall of the housing 70 and which can be closed by means of covers, 74 and 75.

Depending on the conditions of use of the positively acting mechanism and of the tool associated with this mechanism, a secondary actuating axle, similar to the axle 58 shown in FIG. 2, can be mounted on the inside of the orifices after the removal of the covers 74 and 75.

Such secondary actuating axles have, at their ends, a bevel wheel which meshes with the bevel wheel of the axle 73 in order to set it in rotation by means of the secondary axle.

In general terms, the device according to the invention is used to obtain the release of a positively acting mechanism associated with a tool used for working on highly irradiated equipment placed under a several meters of water in a well of a nuclear reactor or in a fuel-assembly storage pool.

The activation of this tool is obtained by means of the thrust exerted by the elastic means on the rod of the jack. The activation of the tool is therefore independent of the feed of the jack.

For example, if grasping tongs are involved, the tongs can be maintained in a clamping position by means of a spring exerting a thrust on the rod of the jack.

If the jack can no longer be fed with hydraulic fluid or with demineralized water as a result of a failure of the feed circuit, the auxiliary release device is used for freeing the tool from the equipment on which it is located in the working position. This operation can be carried out by an operator who is positioned on the service platform of the pool can who actuates a pole, to which is fastened a key intended for interacting with the end knuckle of the main actuating axle or of one of the secondary actuating axles of the release device.

The axle best placed to allow the device to be operated easily is selected.

It may be noted that the device is irreversible, and the rod of the jack can be returned to the positive actuation position only by rotating the actuating axle in the direction opposite to the direction of release. This rotation of the actuating axle of the device in the opposite direction makes it possible to displace the nut in the direction opposite to the release, i.e., in the vertical upward direction in FIG. 1.

The thrust piece fixed to the rod of the jack and the jack rod itself can then follow the ascent of the nut under the effect of the thrust of the spring 18 which was compressed during the release.

The device according to the invention therefore makes it possible to intervene in all circumstances for the remote neutralization of the positive action of a mechanism associated with a tool, in the event of a failure of the jack of the positively acting mechanism or of its feed circuit.

The invention is not limited to the embodiments described.

Thus, the actuating axle of the device may have a different configuration, its end part having means of assembly with a tool for setting in rotation may have a form other than that of a knuckle, and the nut may have means for the engagement of the thrust piece of the jack rod which are different from those described.

A device identical to the release device according to the invention could be used to obtain the positive action of the mechanism associated with the tool. A device, such as that described, could likewise be used for actuating the tool directly, without the use of an intermediate jack.

The activation of the tool can then be carried out by an operator using a pole, to the end of which is fastened a key capable of engaging the end part of the axle of the device according to the invention.

What is claimed is:

1. Auxiliary remote-controlled release device for a positively acting mechanism comprising a jack having a rod connected, by a first end of said rod, to a member whose actuation or retention it ensures, and, at a second end of said rod, to a thrust piece, on which a helical spring comes to bear, in order to effect actuation or retention of said member, said spring being arranged in a housing fixed relative to a body of said jack, and actuation of said jack causing displacement of said rod in a direction opposite to a direction of actuation of said rod by said helical spring, said device comprising
- (a) an axle parallel to said rod of said jack, mounted rotatably in said housing and comprising a threaded part on an inside of said housing and an end part located outside of said housing and having means for setting said axle in rotation; and
- (b) a nut engaged on said threaded part of said axle and fixed to a fork for engagement of said thrust piece of said rod of said jack, for displacing said thrust piece in a direction opposite to a direction of actuation of said helical spring, by setting said axle in rotation, in the event of failure of said jack.

2. Device according to claim 1, wherein said threaded part of said axle consists of a first rod mounted rotatably in said housing by means of ball bearings, and the second part of said axle consists of a second rod joined to the threaded rod by screwing an end part of said rod into an internally threaded bore of the rod and by locking with a pin.

3. Device according to claim 1, wherein the means located at the end of said axle for interacting with said corresponding means for setting the axle in rotation consist of a knuckle and a pin engaged inside said knuckle in a radial direction.

4. Device according to claim 1, further comprising at least one secondary actuating axle having an end part located outside said housing and capable of coming into engagement with a tool for setting in rotation, and an opposite end part fixed to a driving bevel wheel, the secondary actuating axle being arranged perpendicularly relative to the axle and parallel to the jack rod forming the main axle, on which is mounted a bevel wheel meshing with the bevel wheel fixed to the end of the secondary axle.

5. Device according to claim 1, wherein said housing has a lateral surface parallel to the actuating axle of the rod of said jack and two closing flanges at ends of said housing, the end part of the actuating axle passing through the wall of said housing in the region of a flange opposite a flange fastened to said body of said jack.

6. Device according to claim 5, wherein the housing has an orifice passing through at least one of its lateral faces, for mounting of a secondary actuating axle of the release device, said orifice being closed by means of a cover in the absence of a secondary actuating device.

* * * * *